(12) United States Patent
Nicosia

(10) Patent No.: US 6,336,570 B2
(45) Date of Patent: Jan. 8, 2002

(54) PRODUCT DISPENSING DEVICE

(76) Inventor: Carlos Angel Nicosia, 917 Junin St. 6° "A", Ciudad de BS. AS. (AR)

( * ) Notice: Subject to any disclaimer, the term of this patent is extended or adjusted under 35 U.S.C. 154(b) by 0 days.

(21) Appl. No.: 09/836,338

(22) Filed: Apr. 18, 2001

(30) Foreign Application Priority Data

Apr. 18, 2000 (AR) ........................................ P000101804

(51) Int. Cl.$^7$ ................................................ B67D 5/62
(52) U.S. Cl. ................................ 222/146.6; 222/241
(58) Field of Search ........................... 222/145.7, 145.8, 222/146.6, 241, 413

(56) References Cited

U.S. PATENT DOCUMENTS

| | | | | |
|---|---|---|---|---|
| 4,201,558 A | * | 5/1980 | Schwitters et al. | 222/146 |
| 4,878,760 A | * | 11/1989 | Newton et al. | 222/145 |
| 5,159,818 A | * | 11/1992 | Etou et al. | 222/146.6 |
| 5,409,139 A | * | 4/1995 | Daussan et al. | 222/241 |

* cited by examiner

Primary Examiner—Philippe Derakshani
Assistant Examiner—Thach H. Bui
(74) Attorney, Agent, or Firm—Jacobson Holman, PLLC

(57) ABSTRACT

An automatic device for dispensing flowable products at half and low temperatures, the device comprising cylindrical tubes fixed obliquely and each tube including shaking helical screw for feeding the product under pressure towards a bottom end of the cylinder and dispensing the same through a dispensing valve actuated by a pneumatic actuator, an upper end of each cylinder including an air intake valve for feeding pressurized air into the cylinder.

9 Claims, 2 Drawing Sheets

PRODUCT DISPENSING DEVICE

BACKGROUND OF THE INVENTION

1. Field of the Invention

The present invention relates to the field of products dispensing machines for dispensing doses of a product and more particularly refers to an automatic device for the dispensing doses of dense products in half and low temperatures.

More particularly, the invention refers to a special electromechanical body, to expend dosages of dense products kept in low temperatures, such as ice-creams of several variety of flavors, yogurt and also cream cheese etc., which under an electronic command, controls all of the actions of the electromechanical device of the invention.

2. Description of the Prior Art

It is unknown the existence of identical or similar precedents, to its consideration which gives the right of its register.

It would be therefore convenient to have an automatic device for dispensing desired doses of a flowable product, such as ice creams, yogurt, etc.

SUMMARY OF THE INVENTION

It is therefore an object of the present invention to provide an automatic device for dispensing a dose of flowable products, comprising at least one tubular cylinder for containing and dispensing the product, a rotating helical member axially arranged within the cylinder, a loading funnel at an upper end of the cylinder, for receiving the product into the cylinder, a control air-intake valve for controlling the feeding of pressurized air into the cylinder, a product dispensing conduit at a bottom end of the cylinder, a dispensing computer-actuated valve connected to at least one computer for receiving an actuating signal, and a product detecting diaphragm connected to the at least one computer for providing the computer with a signal for actuating the dispensing computer-actuated valve.

It is still another object of the present invention to provide a dispensing device comprising an evaporating tubular hermetic cylinder with a shaky spiral or helical member axially arranged within the cylinder, wherein the shaky spiral is actuated through a shaft actuated by an electric motor connected to a gear reduction or gear ratio box placed in an upper end of the cylinder with the entire body of the cylinder having particularly an inclined or oblique position relative to a vertical plane, the product being dispensed preferably at a temperature of at least 15° C. depending on the regulation, which is achieved with a conventional refrigeration.

It is a further object of the present invention to provide a dispensing device wherein a shaky refrigerating cylinder has also on a top end thereof a funnel for the loading of the product in the interior to process, with a spherical stop cock and, adjoining in the same end, there is an air intake valve of electric command installed for the entrance of pressurized air between 1.000 and 1.600 grammes by litre which is kept in the interior of the cylinder which comes from a compressor of dry operation (without oil) and controlled by a pressure switch.

It is even another object of the present invention to provide a product dispensing device wherein, once the product is inside a cylinder, this one is submitted to a movement with a lifting spiral or helical member and the product is dosed through by a bottom end according to the consumer's request. The device is commanded by a computer and the product passes through a dispensing valve that is a pneumatic valve with opening time which depends on the receptive vessel, ready to be given to the consumer, and also a diaphragm which provides the stop signal. The product that enters inside the refrigerant cylinder can be preferably ice-creams and each flavor will have an individual cylinder, for example strawberry-cream, lemon, chocolate etc. Also, it can be provided other cylinders for yogurt, cream cheese, etc. Then, according to the consumer's choice a microprocessor activates an articulated arm which takes the vessel and place the same at each cylinder's exit to fulfill the consumer's request.

It is even another object of the present invention to provide a.

Having exposed the parts of this invention and the function of each one it is clear that it is different from what is habitually known and so a legal register is conferred.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

In order to show the nature of this invention and the way in which it can be used an example will be given and it will be described numerically with the help of illustrations.

Naturally it is understood that this is only an example of what the invention can do an it doesn't limit the reach of it.

The numbers of the references in the illustrations corresponds to equal parts.

Figure 1:
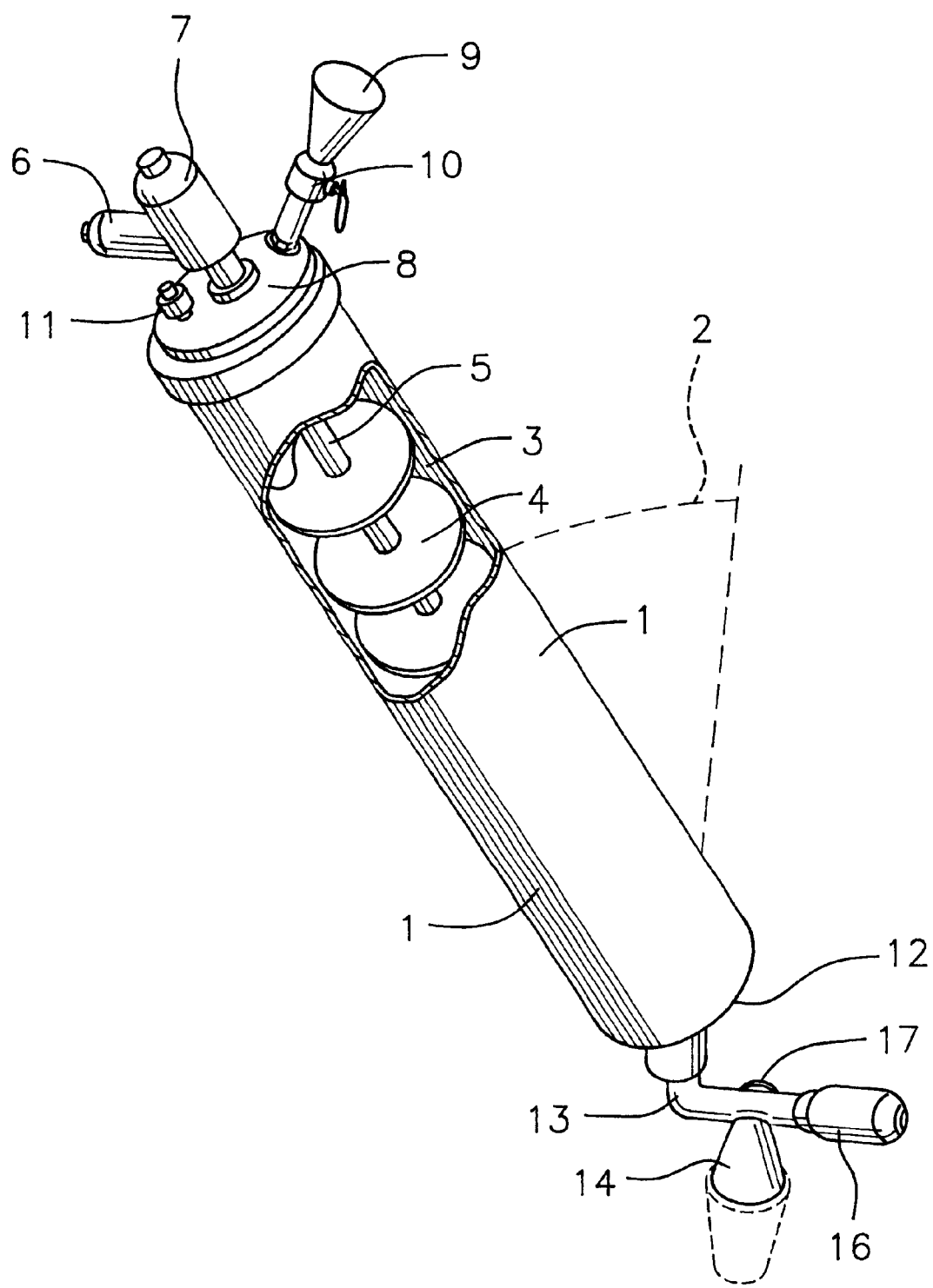
FIG. 1 shows a partially cross-sectional perspective view of a device of the invention.
Figure 2:
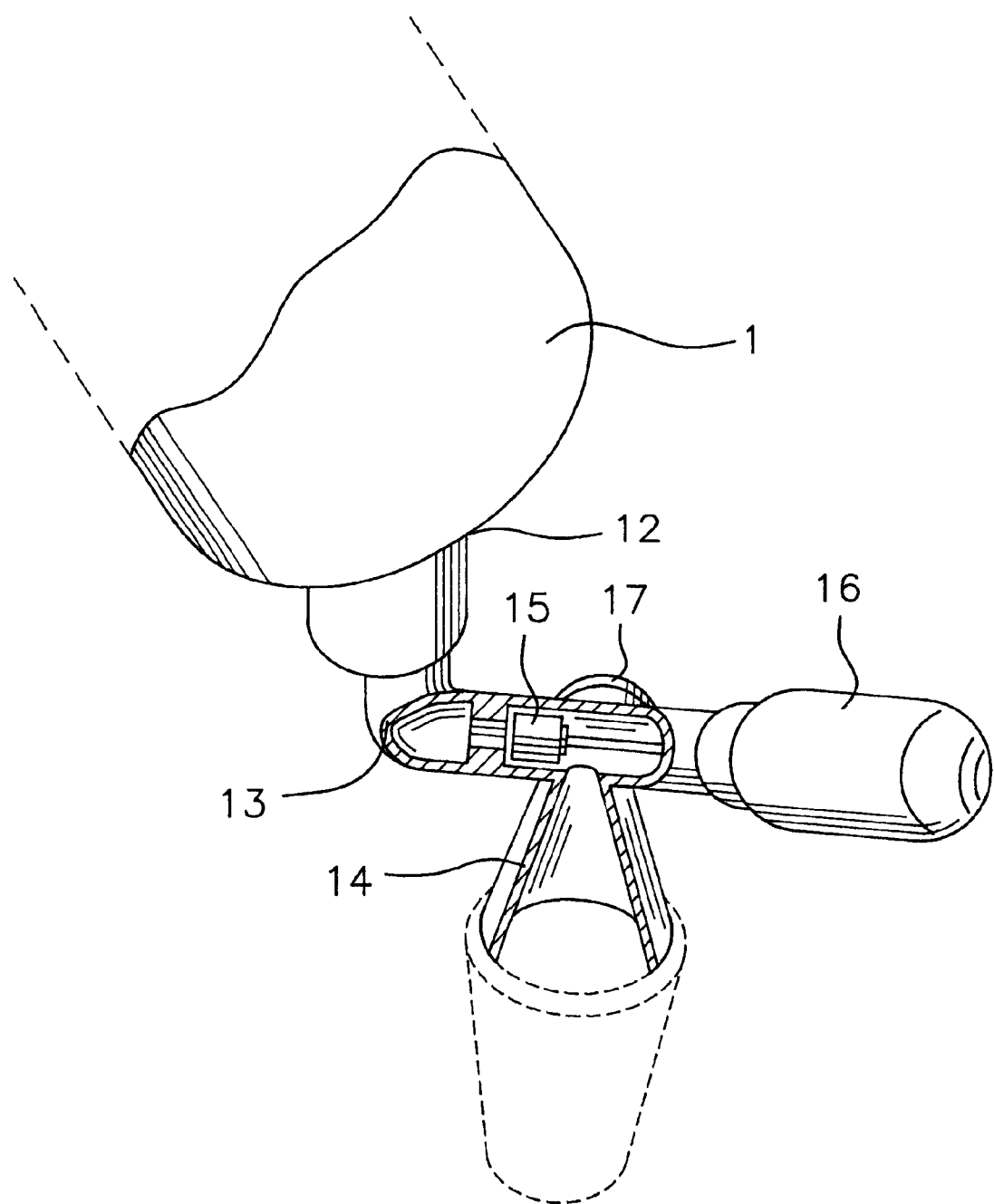
FIG. 2 shows a partially cross-sectional perspective view of a bottom end of the device of FIG. 1, wherein action of the valve is illustrated and it shows that it controls the exit of the product to the vessel.

Now referring in detail to the drawings it may be seen from FIG. 1 and 2, a device according to the invention comprises a tubular cylinder -1- for the refrigeration, having a particular oblique position or inclined position -2- relative to a vertical plane and an interior -3- including a shaking spiral -4- or agitating helical member with a shaft -5- actuated by an electrical motor -6- and a gear reducing or gear ratio box -7- on an upper end -8- .

On that upper end there is a loading funnel -9- where the product is poured -3- after passing a spherical stop cock -10- of manual action.

Adjoining this end -8- by an air intake valve of electric command -3- pressurized air between 1.000 and 1.600 gr/cm2 -11- gets inside through a compressor (not illustrated) commanded by a computer.

On a bottom end -12- of the cylinder -1- there is an exit conduit -13- conducing into an evacuative funnel -14- and the dose of the expenditure is controlled by a dispensing valve -15- which is activated by a pneumatic actuator -16- directed from a computer (not shown) that commands the mechanism, and there is also a diaphragm -17- next to the exit conduit, which provides a stop signal to the computer.

According to the invention, the cylinder is a refrigerated cylinder containing the product under a refrigerating temperature and the refrigerating temperature is 15° C. In addition, the cylinder is arranged in an inclined position relative to a vertical plane and the helical member is a rotating member actuated by an electric motor connected to a gear ratio box and mounted at the upper end of the cylinder.

Furthermore the spherical stop cock is manually operated and is connected between the funnel and the cylinder for controlling the pass of the product from the funnel into the cylinder. Also, the control air-intake valve provides a pressure control for feeding the air at a pressure between 1.0 to 1.6 gr/cm2. The product dispensing conduit ends in a dispensing funnel for dispensing the product into a consumer vessel and the dispensing computer-actuated valve is connected to a pneumatic actuator which is connected to the at least one computer.

While preferred embodiments of the present invention have been illustrated and described, it will be obvious to those skilled in the art that various changes and modifications may be made therein without departing from the scope of the invention as defined in the appended claims.

I claim:

1. An automatic device for dispensing a dose of flowable products, comprising:

at least one tubular cylinder for containing and dispensing the product, a rotating helical member axially arranged within the cylinder, a loading funnel at an upper end of the cylinder, for receiving the product into the cylinder, a control air-intake valve for controlling the feeding of pressurized air into the cylinder, a product dispensing conduit at a bottom end of the cylinder, a dispensing computer-actuated valve connected to at least one computer for receiving an actuating signal, and a product detecting diaphragm connected to the at least one computer for providing the computer with a signal for actuating the dispensing computer-actuated valve.

2. The device of claim 1, wherein the cylinder is a refrigerated cylinder containing the product under a refrigerating temperature.

3. The device of claim 1, wherein the refrigerating temperature is 15° C.

4. The device of claim 1, wherein the cylinder is arranged in an inclined position relative to a vertical plane.

5. The device of claim 1, wherein the rotating helical member is actuated by an electric motor connected to a gear ratio box and mounted at the upper end of the cylinder.

6. The device of claim 1, wherein a manually operated spherical stop cock is connected between the funnel and the cylinder for controlling the pass of the product from the funnel into the cylinder.

7. The device of claim 1, wherein the control air-intake valve provides a pressure control for feeding the air at a pressure between 1.0 to 1.6 gr/cm2.

8. The device of claim 1, wherein the product dispensing conduit ends in a dispensing funnel for dispensing the product into a consumer vessel.

9. The device of claim 1, wherein the dispensing computer-actuated valve is connected to a pneumatic actuator which is connected to the at least one computer.

* * * * *